United States Patent
Koch et al.

(10) Patent No.: US 9,773,136 B2
(45) Date of Patent: Sep. 26, 2017

(54) SYSTEM FOR, AND METHOD OF, ACCURATELY AND RAPIDLY DETERMINING, IN REAL-TIME, TRUE BEARINGS OF RADIO FREQUENCY IDENTIFICATION (RFID) TAGS ASSOCIATED WITH ITEMS IN A CONTROLLED AREA

(71) Applicant: SYMBOL TECHNOLOGIES, LLC, Lincolnshire, IL (US)

(72) Inventors: Michael J. Koch, Fort Salonga, NY (US); Charles B. Swope, Coral Springs, FL (US); Benjamin J. Bekritsky, Modin (IL)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/886,604

(22) Filed: Oct. 19, 2015

(65) Prior Publication Data
US 2017/0109555 A1    Apr. 20, 2017

(51) Int. Cl.
*G06K 7/10* (2006.01)
*G01S 13/75* (2006.01)
(Continued)

(52) U.S. Cl.
CPC ........ *G06K 7/10366* (2013.01); *G01S 13/751* (2013.01); *G06K 7/10099* (2013.01);
(Continued)

(58) Field of Classification Search
CPC ........... G06K 7/10366; G06K 7/10099; G06K 7/10475; G01S 3/32; G01S 3/74;
(Continued)

(56) References Cited

U.S. PATENT DOCUMENTS

| 4,353,073 A | 10/1982 | Brunner et al. |
| 5,066,956 A | 11/1991 | Martin |

(Continued)

FOREIGN PATENT DOCUMENTS

| CA | 2615245 A1 | 6/2008 |
| EP | 1758256 A1 | 2/2007 |

(Continued)

OTHER PUBLICATIONS

Toby Haynes, "A Primer on Digital Beamforming", Spectrum Signal Processing, Mar. 26, 1998; 15 pages.*

(Continued)

*Primary Examiner* — Suezu Ellis

(57) ABSTRACT

A radio frequency identification (RFID) tag reading system and method accurately and rapidly determine, in real-time, true bearings of RFID tags associated with items in a controlled area. Primary transmit and receive beams are steered over the area, and multiple secondary receive beams are substantially simultaneously steered to a plurality of bearings in the area. The highest signal strength of secondary receive signals from the secondary receive beams determines an approximate tag bearing of each tag. Two secondary receive beams at opposite sides of the approximate tag bearing in elevation are selected to obtain a pair of elevation offset signals, and two secondary receive beams at opposite sides of the approximate tag bearing in azimuth are selected to obtain a pair of azimuth offset signals. The elevation offset signals and the azimuth offset signals are processed to determine a true bearing for each tag in real-time.

14 Claims, 7 Drawing Sheets

(51) Int. Cl.
  *G06K 19/077* (2006.01)
  *G06Q 10/08* (2012.01)
  *G01S 13/02* (2006.01)

(52) U.S. Cl.
  CPC ... *G06K 7/10356* (2013.01); *G06K 19/07794* (2013.01); *G06Q 10/087* (2013.01); *G01S 2013/0245* (2013.01)

(58) Field of Classification Search
  CPC ........ G01S 13/74; G01S 13/75; G01S 13/762; G01S 2013/0245; G01S 13/87; G01S 13/872; G01S 13/878
  See application file for complete search history.

(56) References Cited

U.S. PATENT DOCUMENTS

| | | |
|---|---|---|
| 5,173,703 A | 12/1992 | Mangiapane et al. |
| 5,181,040 A | 1/1993 | Inoue et al. |
| 5,859,610 A | 1/1999 | Lenormand et al. |
| 7,079,035 B2 | 7/2006 | Bock et al. |
| 7,250,902 B2 | 7/2007 | Manoogian et al. |
| 7,310,045 B2 | 12/2007 | Inui |
| 7,602,293 B2 | 10/2009 | Taki et al. |
| 7,777,609 B2 | 8/2010 | Kuramoto |
| 7,928,894 B1 | 4/2011 | Fox |
| 8,115,594 B2 | 2/2012 | Koezuka et al. |
| 8,248,306 B2 | 8/2012 | Legay et al. |
| 8,305,265 B2 | 11/2012 | Ezal et al. |
| 8,390,458 B2 | 3/2013 | Nonaka et al. |
| 8,427,370 B2 | 4/2013 | Pozgay |
| 8,461,965 B2 | 6/2013 | Chen et al. |
| 8,482,387 B2 | 7/2013 | Iwahashi |
| 8,493,182 B2 | 7/2013 | Hofer et al. |
| 8,558,731 B1 | 10/2013 | Woodell |
| 8,577,308 B2 | 11/2013 | Choi et al. |
| 8,587,495 B2 | 11/2013 | Faraone et al. |
| 8,952,844 B1 | 2/2015 | Wasiewicz |
| 9,059,754 B2 | 6/2015 | Zhang et al. |
| 9,111,190 B2 | 8/2015 | Jacques et al. |
| 9,177,180 B2 | 11/2015 | Sano |
| 9,361,494 B2* | 6/2016 | Swope ............... G06K 7/10366 |
| 2005/0110641 A1 | 5/2005 | Mendolia et al. |
| 2005/0113138 A1 | 5/2005 | Mendolia et al. |
| 2005/0280508 A1 | 12/2005 | Mravca et al. |
| 2006/0181393 A1 | 8/2006 | Raphaeli |
| 2007/0060802 A1 | 3/2007 | Ghevondian et al. |
| 2007/0080787 A1 | 4/2007 | Taki et al. |
| 2007/0273530 A1 | 11/2007 | Koezuka et al. |
| 2008/0157934 A1 | 7/2008 | Posamentier |
| 2008/0157970 A1 | 7/2008 | Single et al. |
| 2008/0180221 A1 | 7/2008 | Tuttle |
| 2008/0224828 A1 | 9/2008 | Ando et al. |
| 2008/0297324 A1 | 12/2008 | Tuttle |
| 2009/0002165 A1 | 1/2009 | Tuttle |
| 2009/0073041 A1 | 3/2009 | Ferreol et al. |
| 2009/0147625 A1 | 6/2009 | Pillai et al. |
| 2009/0240120 A1 | 9/2009 | Mensinger et al. |
| 2010/0039228 A1 | 2/2010 | Sadr et al. |
| 2010/0123617 A1 | 5/2010 | Yu et al. |
| 2010/0151810 A1 | 6/2010 | Grau Besoli et al. |
| 2010/0188211 A1 | 7/2010 | Brommer et al. |
| 2010/0207738 A1* | 8/2010 | Bloy ..................... G01S 5/0215 340/10.3 |
| 2010/0225480 A1 | 9/2010 | Bloy et al. |
| 2010/0231410 A1 | 9/2010 | Seisenberger et al. |
| 2010/0237995 A1 | 9/2010 | Iwahashi |
| 2011/0006885 A1 | 1/2011 | Park et al. |
| 2011/0018691 A1 | 1/2011 | Park et al. |
| 2011/0050421 A1 | 3/2011 | Duron et al. |
| 2011/0063095 A1 | 3/2011 | Tomiyama et al. |
| 2011/0133891 A1 | 6/2011 | Krug et al. |
| 2011/0169613 A1 | 7/2011 | Chen et al. |
| 2011/0270045 A1 | 11/2011 | Lebel et al. |
| 2012/0075073 A1 | 3/2012 | Fislage |
| 2012/0139810 A1 | 6/2012 | Faraone et al. |
| 2012/0189078 A1 | 7/2012 | Eom et al. |
| 2012/0248187 A1 | 10/2012 | Piazza et al. |
| 2012/0262358 A1 | 10/2012 | Wallner |
| 2012/0314791 A1 | 12/2012 | Zhang et al. |
| 2013/0021141 A1 | 1/2013 | Brommer et al. |
| 2013/0099898 A1 | 4/2013 | Bloy |
| 2013/0106671 A1 | 5/2013 | Eom et al. |
| 2013/0113669 A1 | 5/2013 | Bellows |
| 2013/0127620 A1 | 5/2013 | Siebers et al. |
| 2013/0201003 A1 | 8/2013 | Sabesan et al. |
| 2014/0104125 A1 | 4/2014 | Choiniere et al. |
| 2014/0197928 A1* | 7/2014 | Jacques ..................... G01S 3/28 340/10.3 |
| 2014/0201423 A1 | 7/2014 | Jean et al. |
| 2014/0266894 A1 | 9/2014 | Rasheed et al. |
| 2014/0361078 A1* | 12/2014 | Davidson ........... G06K 7/10356 235/385 |
| 2015/0123869 A1 | 5/2015 | Bit-Babik et al. |
| 2015/0169910 A1* | 6/2015 | Koch ................. G06K 7/10366 340/10.1 |
| 2015/0278565 A1* | 10/2015 | Bekritsky .......... G06K 7/10366 340/10.32 |
| 2015/0323662 A1 | 11/2015 | Swope et al. |
| 2016/0001803 A1 | 1/2016 | Kim et al. |
| 2016/0003930 A1* | 1/2016 | Swope ............... G06K 7/10475 342/368 |
| 2016/0103198 A1* | 4/2016 | Swope ................... G01S 3/046 342/372 |
| 2016/0152350 A1* | 6/2016 | Puentes .................. B64F 1/368 340/10.5 |

FOREIGN PATENT DOCUMENTS

| | | |
|---|---|---|
| WO | 92/00531 A1 | 1/1992 |
| WO | 2008/082434 A2 | 7/2008 |
| WO | 2009/151778 A2 | 12/2009 |
| WO | 2011/135328 A2 | 11/2011 |
| WO | 2014/113363 A1 | 7/2014 |

OTHER PUBLICATIONS

International Search Report and Written Opinion dated Apr. 4, 2014 for International Patent Application No. PCT/US2014/011411.
International Search Report and Written Opinion dated Mar. 6, 2015 for International Patent Application No. PCT/US2014/069112.
International Search Report and Written Opinion dated Jun. 22, 2015 for International Patent Application No. PCT/US2015/021486.
International Search Report and Written Opinion dated Aug. 5, 2015 for International Patent Application No. PCT/US2015/029423.
Hajime Sakamoto and Peyton Z. Peebles, Jr., "Conopulse Radar" IEEE Transactions on Aerospace and Electronic Systems, vol. AES-14, No. 1 (Jan. 1978).
Spong, "An Efficient Method for Computing Azimuth and Elevation Angle Estimates from Monopulse Ratio Measurements of a Phased Array Pencil Beam Radar with Two-Dimensional Angle Steering," Radar Conference, 1999, The Record of the 1999 IEEE (Apr. 20, 1999).
EPC Global, EPC Radio-Frequency Identify Protocols Class-1 Generation-2 UHF RFID Protocol for Communications at 860 MHz-960 MHz; Version 1.2.0, SG EPC Global Specification for RFID Air Interface, 108 pages. (Oct. 23, 2008).
Patil et al., "An Emerging Anti Collision Protocol in RFID," 2010 National Conference on Advances in Recent Trends in Communication and Networks, 3 pages (Jan. 15-16, 2010).
International Search Report and Written Opinion for International Patent Application No. PCT/US2016/056333 dated May 9, 2017.

* cited by examiner

SYSTEM FOR, AND METHOD OF, ACCURATELY AND RAPIDLY DETERMINING, IN REAL-TIME, TRUE BEARINGS OF RADIO FREQUENCY IDENTIFICATION (RFID) TAGS ASSOCIATED WITH ITEMS IN A CONTROLLED AREA

BACKGROUND OF THE INVENTION

The present disclosure relates generally to a system for, and a method of, accurately and rapidly determining, in real-time, true bearings of radio frequency (RF) identification (RFID) tags associated with items in a controlled area, especially for locating and tracking the RFID-tagged items for inventory control.

Radio frequency (RF) identification (RFID) technology is becoming increasingly important for logistics concerns, material handling and inventory management in retail stores, warehouses, distribution centers, buildings, and like controlled areas. An RFID system typically includes an RFID reader, also known as an RFID interrogator, and preferably a plurality of such readers distributed about a controlled area. Each RFID reader interrogates one or more RFID tags in its coverage range. Each RFID tag is usually attached to, or associated with, an individual item, or to a package for the item, or to a pallet or container for multiple items. Each RFID reader transmits an RF interrogating signal, and each RFID tag, which senses the interrogating RF signal, responds by transmitting a return RF signal. The RFID tag either generates the return RF signal originally, or reflects back a portion of the interrogating RF signal in a process known as backscatter. The return RF signal may further encode data stored internally in the tag. The return signal is demodulated and decoded into data by each reader, which thereby identifies, counts, or otherwise interacts with the associated item. The decoded data can denote a serial number, a price, a date, a destination, other attribute(s), or any combination of attributes, and so on.

The RFID tag typically includes an antenna, a power management section, a radio section, and frequently a logic section, a memory, or both. In earlier RFID tags, the power management section included an energy storage device, such as a battery. An RFID tag with an active transmitter is known as an active tag. An RFID tag with a passive transmitter is known as a passive tag and backscatters. Advances in semiconductor technology have miniaturized the electronics so much that an RFID tag can be powered solely by the RF signal it receives. An RFID tag that backscatters and is powered by an on-board battery is known as a semi-passive tag.

The RFID system is often used to locate and track RFID-tagged items in an inventory monitoring application. For example, in order to take inventory of RFID-tagged items in a retail store, it is known to position at least one RFID reader in the controlled area, and then, to allow each reader to automatically read whatever tagged items are in the coverage range of each reader. For superior RF coverage, it is known to provide each reader with an array of antenna elements that transmit the RF interrogating signal as a primary transmit beam that is electronically steered both in azimuth, e.g., over an angle of 360 degrees, and in elevation, e.g., over an angle of about 90 degrees, and that receive the return RF signal as a primary receive beam from the tags.

As advantageous as such known inventory-taking RFID systems utilizing antenna arrays have been, it has proven difficult in practice to accurately determine, with a high degree of precision, the true bearing, i.e., the angular direction both in azimuth and elevation, of a particular tag, relative to a particular reader. There is a practical limit on the number of antenna elements that can be used in each array. This antenna element limit causes each primary transmit beam and each corresponding primary receive beam to have a relatively broad beam width. It has also proven difficult in practice to rapidly determine the true bearing of a particular tag relative to a particular reader in real-time. The primary transmit beam is typically incrementally moved over successive time periods and steered throughout the controlled area in a "hunting" mode of operation until the reader finds, and samples, the tag with the highest or peak receive signal strength (RSS) of the primary receive beam at a primary steering angle. Depending on the size of the controlled area, it can take a significant amount of time, as well as multiple movements of the primary transmit beam and multiple samples of the RSS, to find the peak RSS of each tag and, hence, its tag bearing. Determining the bearing, i.e., the angular direction both in azimuth and elevation, of each tag based on the peak RSS of the primary receive beam has not only been imprecise due to the aforementioned limit on the number of antenna elements and the relatively broad beam width, but also slow. Bearing errors on the order of 5 to 10 degrees, lengthy latency delays, and limits on the number of tags that can be located and tracked in a given amount of time have been reported, and are not tolerable in many applications.

Accordingly, there is a need to more accurately determine the true bearings of RFID tags, to more rapidly determine the true bearings of RFID tags, to reduce the latency in finding each tag with the highest RSS, and to increase the number of tags that can be located and tracked in a given amount of time.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
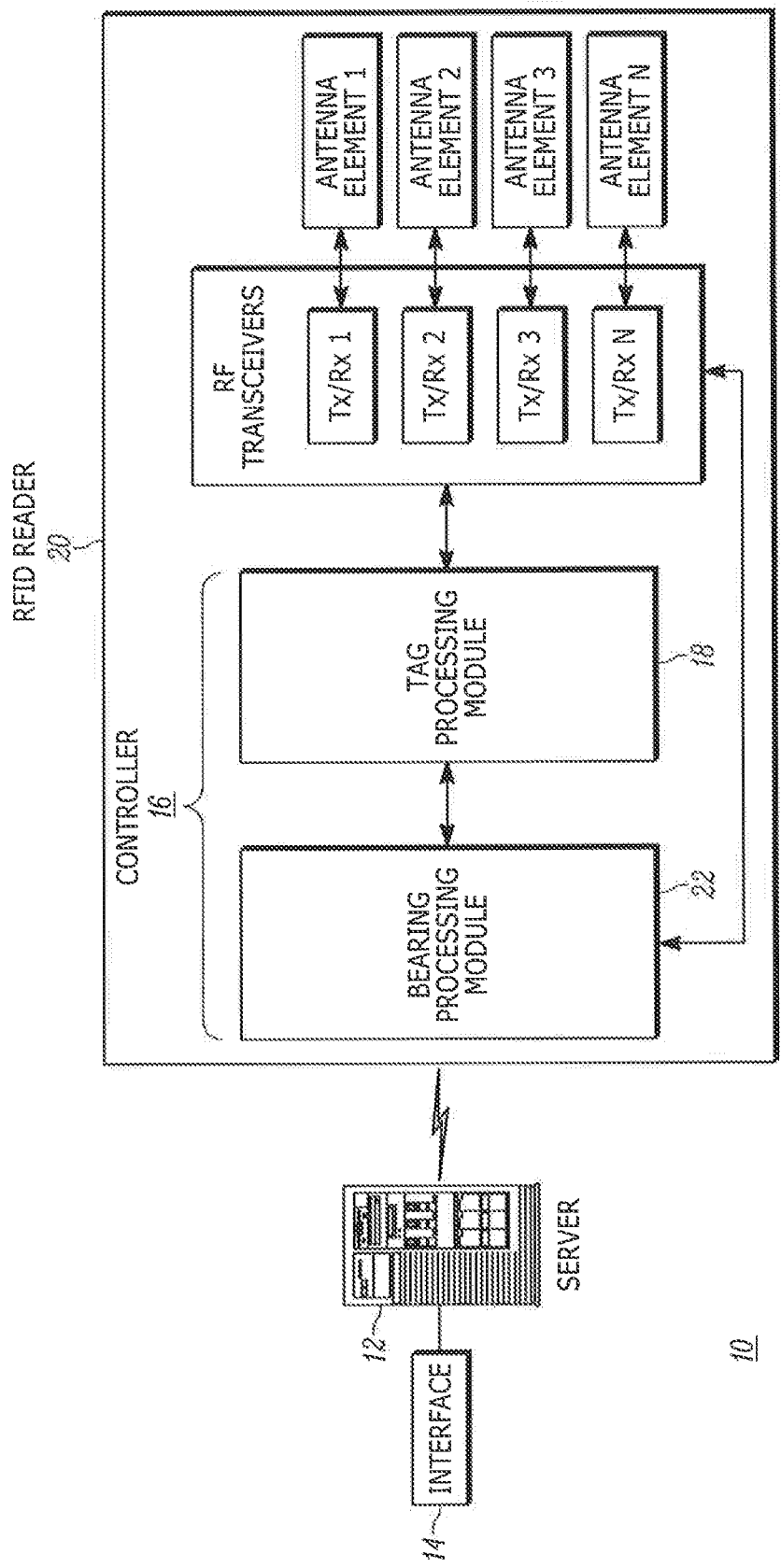
FIG. 1 is a schematic view of an exemplary radio frequency identification (RFID) tag reading system for accurately determining true bearings of RFID tags in real-time in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to a radio frequency (RF) identification (RFID) tag reading system for accurately and rapidly determining, in real-time, true bearings of RFID tags associated with items in a controlled area. The controlled area may be a retail store, a warehouse, or any other confined or open area in which RFID-tagged items are to be monitored. The controlled area may be indoors or outdoors, and may be a single sector or volume of space, or may be, and often is, subdivided into multiple sectors. The system includes an RFID reader having an array of antenna elements, e.g., a phased array; a plurality of RF transceivers; and a controller or programmed microprocessor operatively connected to the transceivers, and operative for controlling the transceivers.

The controller executes a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag. The controller also executes a bearing processing module operative for substantially simultaneously steering a plurality of secondary receive offset beams to a plurality of bearings in the controlled area at a plurality of different secondary steering angles that are offset from the primary steering angle by receiving a plurality of secondary receive offset signals via the antenna elements from each tag. The controller processes the secondary receive offset signals to determine a true bearing for each tag in real-time.

Preferably, the controller processes signal strengths of the secondary receive offset signals to determine an approximate tag bearing of each tag in the controlled area, preferably by selecting the secondary receive offset signal that has a peak processing signal strength from among all the secondary receive offset signals. The controller selects a first pair of the secondary receive offset beams at opposite sides of the approximate tag bearing in elevation to obtain a pair of elevation offset signals, selects a second pair of the secondary receive offset beams at opposite sides of the approximate tag bearing in azimuth to obtain a pair of azimuth offset signals, and then processes the elevation offset signals and the azimuth offset signals to determine a true bearing for each tag in real-time. Advantageously, the bearing processing module processes the elevation offset signals by dividing their difference by their sum to obtain an elevation error signal as an elevation correction to the primary steering angle, and processes the azimuth offset signals by dividing their difference by their sum to obtain an azimuth error signal as an azimuth correction to the primary steering angle.

In a preferred embodiment, the bearing processing module is operative for steering each secondary receive offset beam by receiving the secondary receive offset signals over a plurality of channels, e.g., four channels. A complex multiplier and a programmable device for setting a complex coefficient for the complex multiplier are provided on each channel, to introduce a weighting factor on each channel to effect steering. All the secondary receive offset beams are steered to the plurality of bearings in each sector at one time, each sector in its turn. Advantageously, each sector is approximately equal to the beamwidth of the primary transmit beam. The system advantageously includes a server operatively connected to the RFID reader, and the bearing processing module is implemented in either the RFID reader and/or the server. The RFID reader is preferably mounted in an overhead location of the controlled area and, depending on the application, a plurality of RFID readers may be deployed in the controlled area.

A method, in accordance with another aspect of this disclosure, relates to a radio frequency (RF) identification (RFID) tag reading method of accurately and rapidly determining, in real-time, true bearings of RFID tags associated with items in a controlled area. The method is performed by mounting an RFID reader having an array of antenna elements and a plurality of RF transceivers, in the controlled area; by controlling the transceivers by having a controller execute a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag; by controlling the transceivers by having the controller execute a bearing processing module operative for substantially simultaneously steering a plurality of secondary receive offset beams to a plurality of bearings in the controlled area at a plurality of different secondary steering angles that are offset from the primary steering angle by receiving a plurality of secondary receive offset signals via the antenna elements from each tag; and by processing the secondary receive offset signals to determine a true bearing for each tag in real-time. The method is advantageously further performed by processing signal strengths of the secondary receive offset signals to determine an approximate tag bearing of each tag in the controlled area, by selecting a first pair of the secondary receive offset beams at opposite sides of the approximate tag bearing in elevation to obtain a pair of elevation offset signals, by selecting a second pair of the secondary receive offset beams at opposite sides of the approximate tag bearing in azimuth to obtain a pair of azimuth offset signals, and by processing the elevation offset signals and the azimuth offset signals to determine a true bearing for each tag in real-time.

Turning now to the drawings, FIG. 1 depicts a simplified depiction of a radio frequency (RF) identification (RFID) tag reading system 10 for accurately and rapidly determining, in real-time, true bearings of RFID tags associated with items to be tracked or monitored. The system 10 has an RFID reader 20 connected to a server or host 12 and a user interface 14. The RFID reader 20 has an array of antenna elements 1, 2, 3 . . . , N, preferably a phased array. The RFID reader 20 also has a plurality of RF transceivers Tx/Rx 1, Tx/Rx 2, Tx/Rx 3, . . . , Tx/Rx N, one transceiver for, and connected to, each antenna element. The number N is arbitrary and depends on the particular application. By way of non-limiting example, sixteen antenna elements and sixteen transceivers may be employed. Although FIG. 1 depicts one transceiver for each antenna element, this need not be the case. The number of transceivers may be different from the number of antenna elements. For example, a particular transceiver may be shared with two or more antenna elements.

A controller or programmed microprocessor 16 is operatively connected to the transceivers to control their operation. The controller 16 executes a software-based, tag processing module 18, and also executes a software-based, bearing processing module 22. The modules 18 and 22 need not be software-based, but either or both of them could be hardware-based, or could be implemented in both software and hardware. Although the bearing processing module 22 is depicted in FIG. 1 as being implemented in the RFID reader 20, it will be understood that the bearing processing module 22, either in whole or in part, can also be implemented in the server 12.

Figure 2:
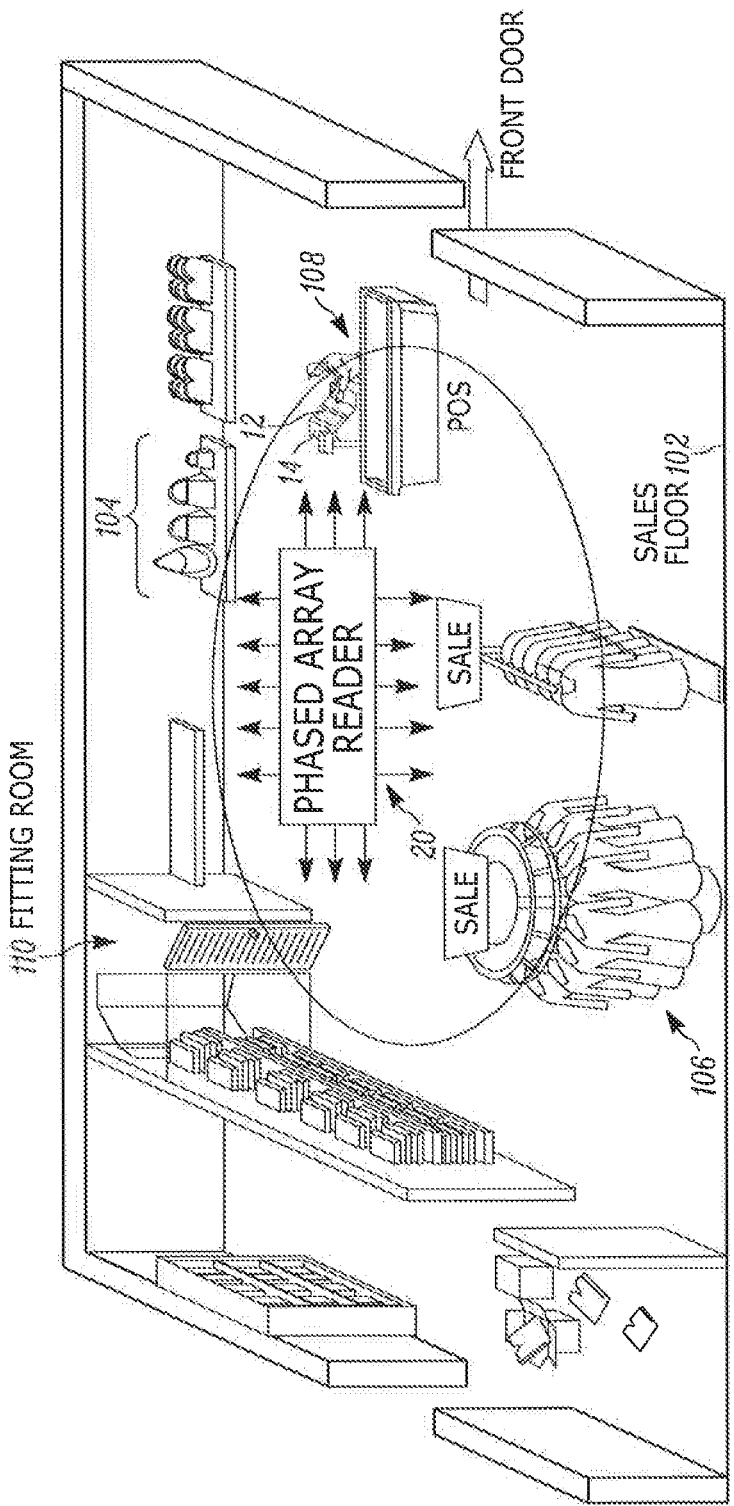
FIG. 2 is a perspective, schematic view of the system of FIG. 1 installed in an exemplary controlled area, especially for inventory control of RFID-tagged items.

FIG. 2 depicts an exemplary depiction of the RFID reader 20 deployed in a controlled area 102 of a retail sales floor having a point-of-sale (POS) station 108 at which the server 12 and the interface 14 may be provided, a fitting room 110, and a plurality of RFID-tagged items, e.g., clothes 106, handbags 104, etc., arranged on shelves, hangers, racks, on the floor, etc. in the controlled area 102. It will be understood that, in some applications, the server 12 is preferably located in a backroom, well away from the sales floor. Each RFID-tagged item 104, 106 is preferably associated with a passive RFID tag for cost reasons, although other types of RFID tags, as described above, may be employed. It will be further understood that, in some applications, for example, in a warehouse, each RFID tag is associated with a pallet or container for multiple items. To simplify the drawing, only one reader 20 has been illustrated, and the reader 20 has been illustrated as being preferably located overhead on the ceiling in the controlled area 102. It will be still further understood that more than one reader 20 could be deployed in the controlled area 102, and not necessarily deployed on the ceiling. Each reader 20 may be powered from an electrical outlet, powered over the Ethernet (POE), or can be battery powered.

The server 12 comprises one or more computers and is in wired, wireless, direct, or networked communication with the interface 14 and with the reader 20. The interface 14 provides a human/machine interface, e.g., a graphical user interface (GUI), that presents information in pictorial and/or textual form (e.g., representations of bearings of the RFID-tagged items 104, 106) to a human user, and to initiate and/or alter the execution of various processes that may be performed by the server 12 and/or by the controller 16. The server 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the server 12 may be a computer, either located at a controlled area 102 (see FIG. 2) containing the RFID-tagged items 104, 106, or remotely at some other location, or can be hosted in a cloud server. The server 12 may include a wireless RF transceiver that communicates with the reader 20. For example, Wi-Fi and Bluetooth® are open wireless standards for exchanging data between electronic devices.

Figure 3A:
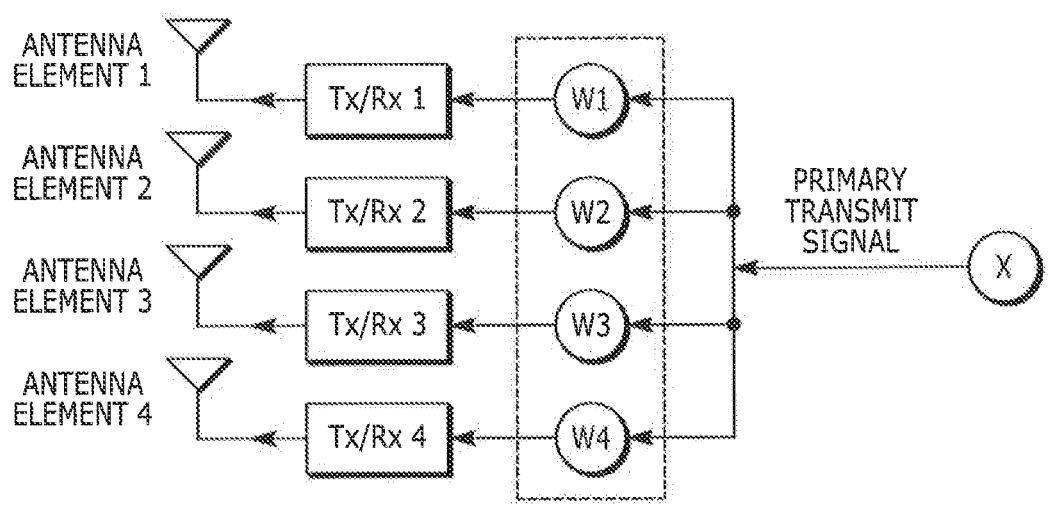
FIG. 3A is a schematic diagram depicting components of the overall system of FIG. 1 during transmission of the primary transmit beam.
Figure 3B:
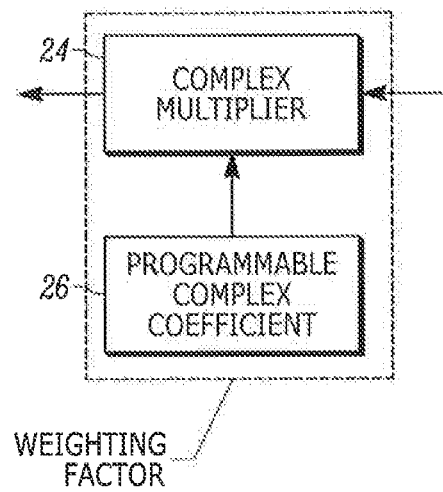
FIG. 3B is a block diagram depicting a detail of a weighting factor component for use in beam steering in the system.

During operation, the controller 16 executes the tag processing module 18 by which the transceivers are commanded to act as a primary transmit beam steering unit operative for steering a primary transmit beam over the controlled area 102 by transmitting a primary transmit signal (X) via the antenna elements to each tag. As shown in FIG. 3A, the primary transmit signal (X) is conducted along different channels (in this example, four) to the plurality of the RF transceivers Tx/Rx 1, Tx/Rx 2, Tx/Rx 3, and Tx/Rx 4 and, in turn, to the plurality of the antenna elements 1, 2, 3 and 4. Steering is accomplished by introducing a different weighting factor W1, W2, W3 and W4 on each channel. As shown in FIG. 3B, each weighting factor is generated by a complex multiplier 24 and a programmable device 26 that sets a complex coefficient for the complex multiplier 24 to effect baseband steering of the primary transmit beam. Baseband steering of the primary transmit beam by setting a complex coefficient for each complex multiplier 24 is known in the art, and details thereof can be obtained, for example, by reference to U.S. Pat. No. 8,587,495 and/or to "A Primer on Digital Beamforming", by Toby Haynes, in Spectrum Signal Processing, Mar. 26, 1998, the entire contents of said patent and said primer being incorporated herein by reference thereto.

Figure 4:
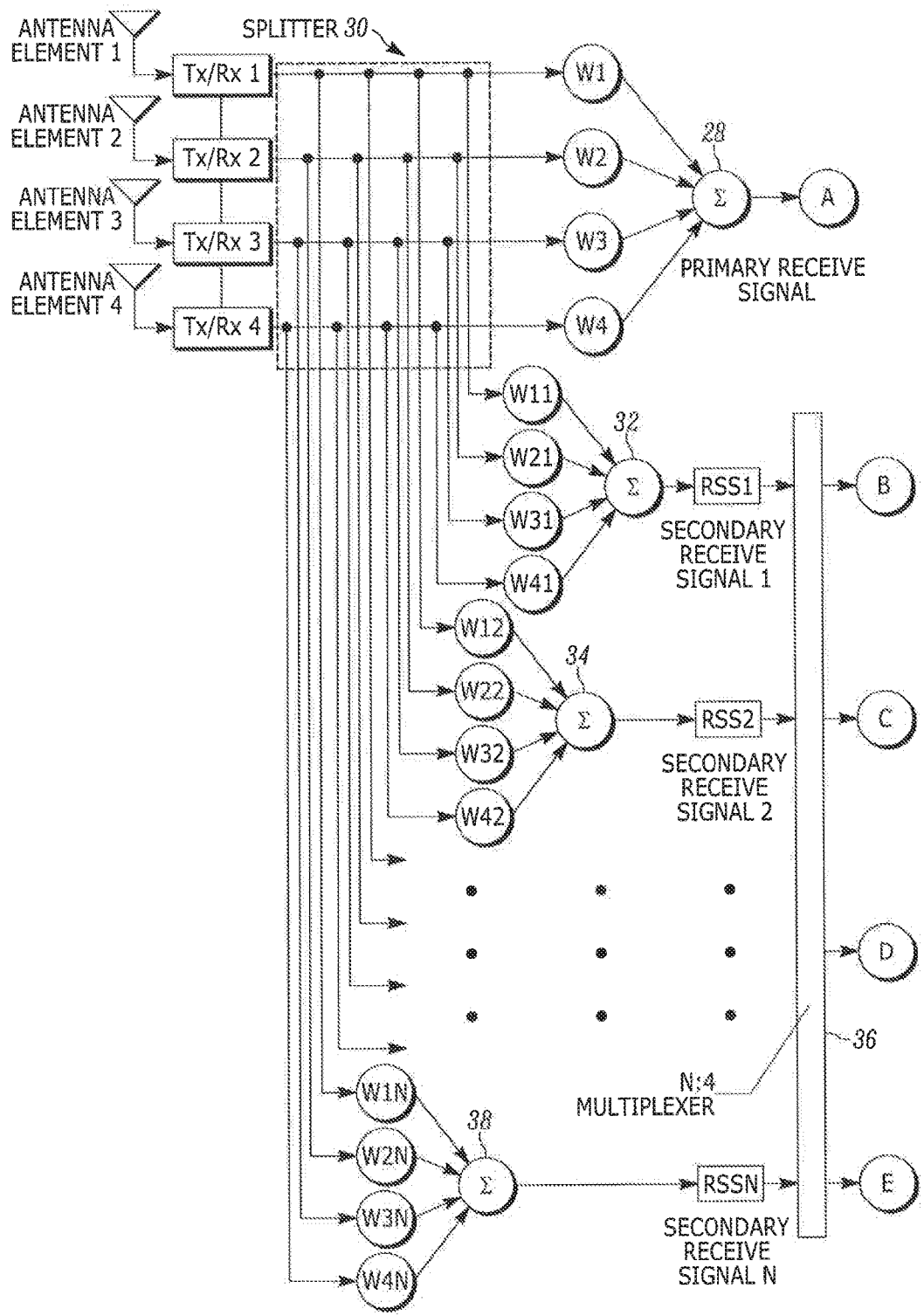
FIG. 4 is a schematic diagram depicting components of the overall system of FIG. 1 during reception of the primary receive beam, as well as of additional secondary receive beams.

During operation, the controller 16 also executes the tag processing module 18 by which the transceivers are commanded to act as a primary receive beam steering unit operative for steering a primary receive beam at a primary steering angle by receiving a primary receive signal (A) via the antenna elements from each tag. As shown in FIG. 4, the antenna elements 1, 2, 3 and 4 receive return signals from each interrogated tag along different channels (in this example, four), and the return signals from these four channels are respectively conducted to the plurality of the RF transceivers Tx/Rx 1, Tx/Rx 2, Tx/Rx 3, and Tx/Rx 4. A different weighting factor W1, W2, W3 and W4 is introduced on each channel before all the weighted return signals are summed in an adder 28 in order to generate the primary receive signal (A). Each weighting factor is generated by the circuit of FIG. 3B. Steering of the primary receive beam is effected by the weighting factors W1, W2, W3 and W4. As illustrated, the weighting factors (FIG. 4) used in steering the primary receive beam is, in a preferred embodiment, the same as the weighting factors (FIG. 3A) used in steering the primary transmit beam. As a result, the steering angle for both the primary transmit beam and the primary receive beam is the same, or nearly so, i.e., they have a common boresight or general bearing. However, it will be understood that the weighting factors used in steering the primary receive beam may be different from the weighting factors used in steering the primary transmit beam, in which case, the steering angle for the primary transmit beam is different from the steering angle for the primary receive beam.

As described above, the practical limit on the number N of antenna elements that can be used in the known array causes the primary transmit beam and the corresponding primary receive beam to each have a relatively broad beam width, thereby rendering it difficult in practice to very accurately determine the true bearing, i.e., the angular direction both in azimuth and elevation, of a particular tag, relative to the reader. Bearing errors on the order of 5 to 10 degrees have been reported and are not tolerable in many applications. One aspect of this disclosure is directed to reducing such errors, preferably to less than one degree. As also described above, the known primary transmit beam is typically incrementally moved over successive time periods and steered throughout the controlled area in a "hunting" mode of operation until the reader finds, and samples, the tag with the highest or peak receive signal strength (RSS) of the primary receive beam at a primary steering angle. Depending on the size of the controlled area, it can take a significant amount of time, as well as multiple movements of the primary transmit beam and multiple samples of the RSS, to find the peak RSS of each tag and, hence, its tag bearing. Lengthy latency delays, and limits on the number of tags that can be located and tracked in a given amount of time have been reported, and are not tolerable in many applications. Another aspect of this disclosure is therefore directed to reducing such latency delays, and increasing the number of tags that can be located and tracked in a given amount of time.

In accordance with this disclosure, and as further shown in FIG. 4, the return signals from each interrogated tag from the antenna elements 1, 2, 3 and 4 are conducted through respective RF transceivers Tx/Rx 1, Tx/Rx 2, Tx/Rx 3, Tx/Rx 4, to a splitter 30, and then routed to a plurality of N sub-circuits to simultaneously generate a plurality of different secondary receive signals 1 . . . N, for forming a plurality of different secondary receive beams that are offset from the primary receive beam. Thus, the return signals are conducted from the splitter 30 to a first set of weighting factors W11, W21, W31 and W41 before being summed in a first adder 32 to generate a first secondary receive signal 1 having a first received signal strength RSS1; to a second set of weighting factors W12, W22, W32 and W42 before being summed in a second adder 34 to generate a second secondary receive signal 2 having a second received signal strength RSS2; and so on to additional sets of weighting factors and additional adders to generate additional secondary receive signals having additional received signal strengths, until being conducted to a last set of weighting factors W1N, W2N, W3N and W4N before being summed in a last adder 38 to generate a last secondary receive signal N having a last received signal strength RSSN. Each set of the weighting factors depicted in FIG. 4 for the secondary receive signals is generated by a circuit identical to that depicted in FIG. 3B.

Figure 6:
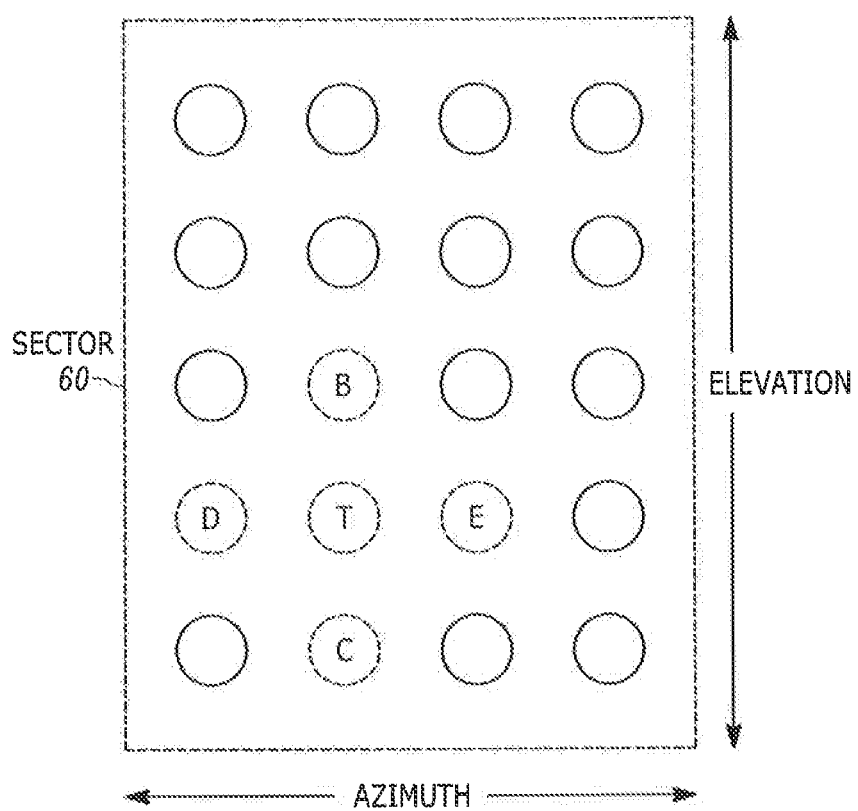
FIG. 6 is a diagram depicting the bracketing of a tag bearing by secondary receive beams in a sector of a controlled area.

As best shown in FIG. 6, each set of the weighting factors for the secondary receive signals is selected to substantially simultaneously steer all the secondary receive offset beams to a plurality of bearings in a representative sector 60 of the controlled area at one time at a plurality of different secondary steering angles that are offset from the primary steering angle. As shown by way of non-limiting example, the sector 60 has a 4×5 array of twenty bearings at which the secondary receive offset beams are simultaneously steered. Advantageously, each sector is approximately equal to the beamwidth of the primary transmit beam. Successively adjacent bearings along the azimuth are about 10° apart, and successively adjacent bearings along the elevation are also about 10° apart. A tag whose bearing is to be determined can be located anywhere in the sector 60 and, as shown by way of example, is located in the $4^{th}$ row, $2^{nd}$ column, at an approximate tag bearing T.

As described above, it is known to incrementally move the primary transmit/receive beam from one bearing to the next within the sector 60 to hunt for the tag bearing by measuring the RSS at each bearing at successive times, and after all these measurements have been made, then determining which tag bearing had the highest or peak RSS. Multiple movements and multiple measurements are taken, all adding up to a non-negligible time to complete, thereby significantly delaying the ultimate determination of the tag bearing. In accordance with this disclosure, the primary transmit/receive beam is not incrementally moved from one bearing to the next within the sector 60 at successive times to find the tag bearing. Instead, by simultaneously directing all the secondary receive offset beams at one time to all the twenty bearings in each sector 60, the RSS of all the secondary receive signals can be measured, and the highest RSS can be determined, at one time.

Returning to FIG. 4, all the secondary receive signals 1 . . . N having their respective received signal strengths RSS1, RSS2, . . . , RSSN are conducted to a corresponding plurality of N inputs of a multiplexer 36 having four outputs, as described below. The controller 16 processes all the received signal strengths and selects the highest, thereby finding an approximate tag bearing T (see FIG. 6). Once the approximate tag bearing T has been found, the controller 16 selects a first pair of the secondary receive offset beams that bracket the elevation of the approximate tag bearing T to be output from the multiplexer 36, and also selects a second pair of the secondary receive offset beams that bracket the azimuth of the approximate tag bearing T to be output from the multiplexer 36. More particularly, one of the first pair of the secondary receive offset beams is formed by a secondary receive elevation plus signal (B) and is located a few degrees, e.g., ten degrees, in one direction away from the elevation of the approximate tag bearing T, and the other of the first pair of the secondary receive offset beams is formed by a secondary receive elevation minus signal (C) and is located a few degrees, e.g., ten degrees, in an opposite direction away from the elevation of the approximate tag bearing T. Similarly, one of the second pair of the secondary receive offset beams is formed by a secondary receive azimuth plus signal (D) and is located a few degrees, e.g., ten degrees, in one direction away from the azimuth of the approximate tag bearing T, and the other of the second pair of the secondary receive offset beams is formed by a secondary receive azimuth minus signal (E) and is located a few degrees, e.g., ten degrees, in an opposite direction away from the azimuth of the approximate tag bearing T.

Figure 5:
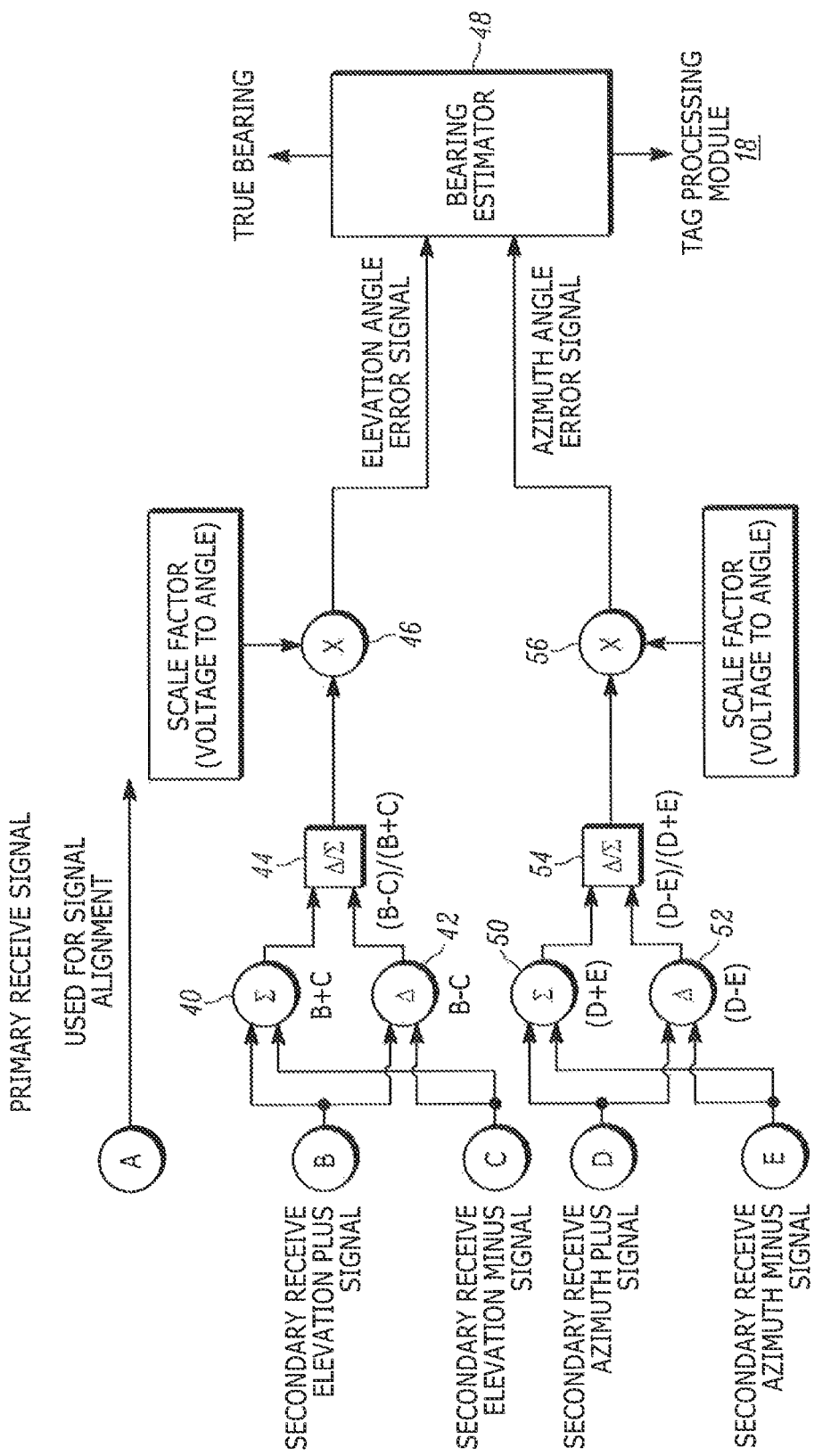
FIG. 5 is a block diagram depicting signal processing of the primary and the secondary receive beams depicted in FIG. 4 to obtain a true bearing for each RFID-tagged item.

Thus, as schematically shown in FIG. 6, four secondary receive offset beams have been formed. The offset beams formed by the plus and minus elevation signals (B) and (C) bracket the elevation of the approximate tag bearing T. The offset beams formed by the plus and minus azimuth signals (D) and (E) bracket the azimuth of the approximate tag bearing T. As shown in FIG. 4, the plus and minus elevation signals (B) and (C) and the plus and minus azimuth signals (D) and (E) are output from the multiplexer 36 and, as shown in FIG. 5, the elevation signals (B) and (C) and the azimuth signals (D) and (E) are separately processed to obtain elevation and azimuth bearing correction factors used to determine the true bearing of each interrogated tag.

Thus, the elevation signals (B) and (C) are summed in an adder 40, and are differenced from each other in a subtractor 42. A divider 44 divides the difference (B−C) from the subtractor 42 by the sum (B+C) from the adder 40, and the output of the divider 44, which is a voltage, is converted to an angle by a converter 46, thereby yielding an elevation angle error signal that is input to a bearing estimator 48. Also, the azimuth signals (D) and (E) are summed in an adder 50, and are differenced from each other in a subtractor 52. A divider 54 divides the difference (D−E) from the subtractor 52 by the sum (D+E) from the adder 50, and the output of the divider 54, which is a voltage, is converted to an angle by a converter 56, thereby yielding an azimuth angle error signal that is input to the bearing estimator 48.

The bearing estimator 48 compares the two elevation and azimuth angle error signals against the elevation and azimuth of the peak secondary receive signal at the approximate tag bearing T, and outputs a true bearing for each interrogated tag. This output can be stored, or sent to the server 12, or it can be sent to the tag processing module 18 for beam steering.

As described so far, four of the antenna elements are employed to steer the each of the secondary receive offset beams around the primary transmit and receive beams. If sixteen antenna elements are employed in the array, then a switch is used to switch the same four RF transceivers to four of the sixteen antenna elements. At any given time, four out of the sixteen antenna elements are active, while the remaining twelve antenna elements are inactive. These four antenna elements are effectively working in one volume or sector 60 of space in the controlled area 102. The remaining antenna elements in the array could be working, either successively or simultaneously, in the same or in different volumes or sectors of space in the controlled area. The antenna elements work in groups, typically four at a time, and advantageously, there may be overlap between antenna elements in the different groups. It will be understood that this disclosure is not intended to be limited to a group of four antenna elements, because a different number or group of antenna elements, and a different number or group of secondary receive offset beams, could be employed.

Figure 7:
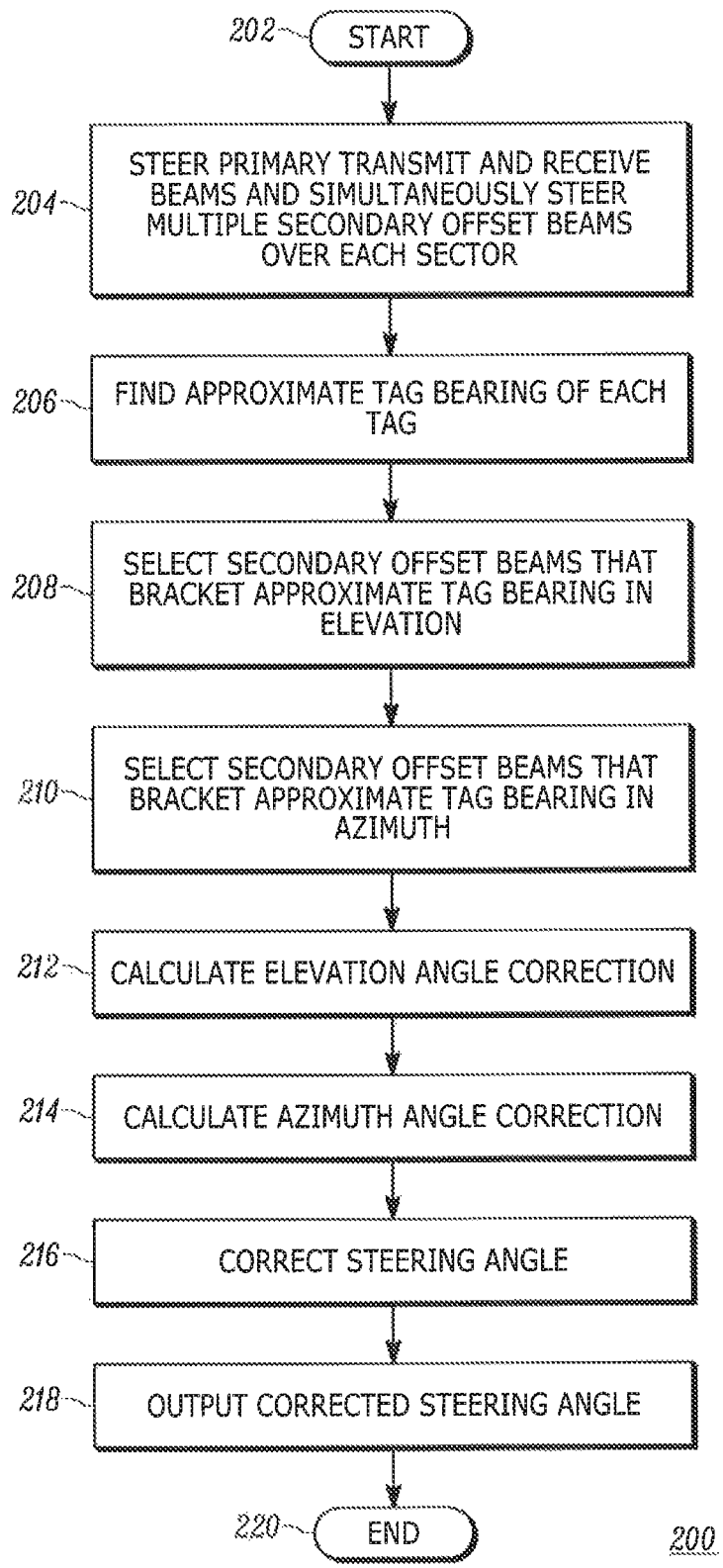
FIG. 7 is a flow chart depicting steps performed in accordance with a method of accurately determining true bearings of RFID tags associated with items in the controlled area in real-time in accordance with the present disclosure.

As described above, and as shown in the flow chart 200 of FIG. 7, beginning at start step 202, the RFID system 10 accurately and rapidly determines, in real-time, the true bearings of RFID tags associated with the items 104, 106 in each sector 60 of the controlled area 102, each sector 60 in its turn, by steering (step 204) not only the primary transmit beam and the primary receive beam over all the tags, but also substantially simultaneously steering multiple secondary receive offset beams at steering angles that are offset in elevation and azimuth over the tags in each sector or controlled area. The controller 16 processes signal strengths of secondary receive offset signals of the secondary receive offset beams to determine an approximate tag bearing of each tag based on the highest RSS (step 206). The controller 16 selects a first pair of the secondary receive offset beams at opposite sides of the approximate tag bearing in elevation to obtain a pair of elevation offset signals (step 208), and selects a second pair of the secondary receive offset beams at opposite sides of the approximate tag bearing in azimuth to obtain a pair of azimuth offset signals (step 210). The controller 16 then processes the elevation offset signals and the azimuth offset signals to determine a true bearing for each tag in real-time for each tag, by calculating an elevation angle correction for the elevation of the steering angle of the peak secondary receive signal at the approximate tag bearing T (step 212) by dividing a difference and a sum of receive elevation offset signals for the elevation offset beams. Similarly, for each listed tag, the controller 16 calculates an azimuth angle correction to the azimuth of the steering angle of the peak secondary receive signal at the approximate tag bearing T (step 214) by dividing a difference and a sum of receive azimuth offset signals for the azimuth offset beams. Next, the steering angle of the peak secondary receive signal at the approximate tag bearing T is corrected for each tag (step 216), and the corrected steering angle, i.e., the true bearing for each tag is output (step 218). The method ends at step 220.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A radio frequency (RF) identification (RFID) tag reading system for accurately and rapidly determining, in real-time, true bearings of RFID tags associated with items in a controlled area, comprising:
   an RFID reader having an array of antenna elements and a plurality of RF transceivers; and
   a controller operatively connected to the transceivers, and the controller configured to control the transceivers by steering a primary transmit beam over the controlled area by transmitting a primary transmit signal via the antenna elements to each tag, and for steering a primary receive beam at a primary steering angle by receiving a primary receive signal via the antenna elements from each tag,
   the controller being further configured to control the transceivers by substantially simultaneously steering a plurality of secondary receive offset beams to a plurality of bearings in the controlled area at a plurality of different secondary steering angles that are offset from the primary steering angle by receiving a plurality of secondary receive offset signals via the antenna elements from each tag, and
   the controller being further configured to process the secondary receive offset signals to determine a true bearing for each tag in real-time,
   wherein the controller is further configured to determine an approximate tag bearing by selecting the secondary receive offset signal that has a peak processing signal strength from among all the secondary receive offset signals, and
   wherein the controller is further configured to: select a first pair of the secondary receive offset beams at opposite sides of the approximate tag bearing in elevation to obtain a pair of elevation offset signals, for selecting a second pair of the secondary receive offset beams at opposite sides of the approximate tag bearing in azimuth to obtain a pair of azimuth offset signals; and process the elevation offset signals and the azimuth offset signals to determine a true bearing for each tag in real-time.

2. The system of claim 1, wherein the controller is further configured to process the elevation offset signals by dividing their difference by their sum to obtain an elevation error signal as an elevation correction to the primary steering angle; process the azimuth offset signals by dividing their difference by their sum to obtain an azimuth error signal as an azimuth correction to the primary steering angle.

3. The system of claim 1, wherein the controller is further configured to steer each secondary receive offset beam by receiving the secondary receive offset signals over a plurality of channels; the system further comprising, on each channel, a complex multiplier and a programmable device for setting a complex coefficient for the complex multiplier to introduce a weighting factor on each channel to effect steering.

4. The system of claim 1, further comprising a server operatively connected to the RFID reader, and wherein the controller is located in at least one of the RFID reader and the server.

5. The system of claim 1, further comprising a multiplexer operatively connected to, and controlled by, the controller, and wherein the multiplexer has a plurality of inputs for receiving all the secondary receive offset signals, and a plurality of outputs for outputting the elevation offset signals and the azimuth offset signals.

6. The system of claim 1, wherein the controlled area has a plurality of sectors, and wherein the controller is further configured to substantially simultaneously steer the plurality of secondary receive offset beams to the plurality of bearings in each sector in succession.

7. A radio frequency (RF) identification (RFID) tag reading system for accurately and rapidly determining, in real-time, true bearings of RFID tags associated with items in a controlled area, comprising:
   an RFID reader mounted in an overhead location in the controlled area, and having an array of antenna elements and a plurality of RF transceivers;
   a server operatively connected to the RFID reader; and
   a controller located in at least one of the RFID reader and the server and operatively connected to the transceivers,
   the controller configured to control the transceivers by steering a primary transmit beam over the controlled area by transmitting a primary transmit signal via the antenna elements to each tag, and for steering a primary receive beam at a primary steering angle by receiving a primary receive signal via the antenna elements from each tag,
   the controller further configured to control the transceivers by substantially simultaneously steering a plurality of secondary receive offset beams to a plurality of bearings in the controlled area at a plurality of different secondary steering angles that are offset from the primary steering angle by receiving a plurality of secondary receive offset signals via the antenna elements from each tag, and
   the controller being further configured to process the secondary receive offset signals to determine a true bearing for each tag in real-time,
   wherein the controller is further configured to determine an approximate tag bearing by selecting the secondary receive offset signal that has a peak processing signal strength from among all the secondary receive offset signals, and
   wherein the controller is further configured to: select a first pair of the secondary receive offset beams at opposite sides of the approximate tag bearing in elevation to obtain a pair of elevation offset signals, for selecting a second pair of the secondary receive offset beams at opposite sides of the approximate tag bearing in azimuth to obtain a pair of azimuth offset signals; and process the elevation offset signals and the azimuth offset signals to determine a true bearing for each tag in real-time.

8. The system of claim 7, further comprising a multiplexer operatively connected to, and controlled by, the controller, and wherein the multiplexer has a plurality of inputs for receiving all the secondary receive offset signals, and a plurality of outputs for outputting the elevation offset signals and the azimuth offset signals.

9. A radio frequency (RF) identification (RFID) tag reading method of accurately and rapidly determining, in real-time, true bearings of RFID tags associated with items in a controlled area, comprising:
mounting an RFID reader having an array of antenna elements and a plurality of RF transceivers, in the controlled area;
controlling the transceivers by a controller steering a primary transmit beam over the controlled area by transmitting a primary transmit signal via the antenna elements to each tag, and for steering a primary receive beam at a primary steering angle by receiving a primary receive signal via the antenna elements from each tag;
controlling the transceivers by the controller substantially simultaneously steering a plurality of secondary receive offset beams to a plurality of bearings in the controlled area at a plurality of different secondary steering angles that are offset from the primary steering angle by receiving a plurality of secondary receive offset signals via the antenna elements from each tag;
processing the secondary receive offset signals to determine a true bearing for each tag in real-time,
determining an approximate tag bearing by selecting the secondary receive offset signal that has a peak processing signal strength from among all the secondary receive offset signals; and,
selecting a first pair of the secondary receive offset beams at opposite sides of the approximate tag bearing in elevation to obtain a pair of elevation offset signals, selecting a second pair of the secondary receive offset beams at opposite sides of the approximate tag bearing in azimuth to obtain a pair of azimuth offset signals, and processing the elevation offset signals and the azimuth offset signals to determine a true bearing for each tag in real-time.

10. The method of claim 9, wherein the processing of the elevation offset signals is performed by dividing their difference by their sum to obtain an elevation error signal as an elevation correction to the primary steering angle, and wherein the processing of the azimuth offset signals is performed by dividing their difference by their sum to obtain an azimuth error signal as an azimuth correction to the primary steering angle.

11. The method of claim 9, wherein steering of each secondary receive offset beam is performed by receiving the secondary receive offset signals over a plurality of channels; and introducing a weighting factor on each channel to effect steering.

12. The method of claim 9, further comprising operatively connecting a server to the RFID reader, the controller located in at least one of the RFID reader and the server.

13. The method of claim 9, further comprising receiving all the secondary receive offset signals at a multiplexer, and outputting the elevation offset signals and the azimuth offset signals from the multiplexer.

14. The method of claim 9, further comprising configuring the controlled area with a plurality of sectors, and wherein the secondary receive offset beams are steered to the plurality of bearings in each sector in succession.

* * * * *